United States Patent

[11] 3,591,261

[72] Inventors: James E. Harvey, Dearborn Heights; Max J. Irland, Dearborn; Victor L. Lindberg, Northville, all of, Mich.
[21] Appl. No. 756,437
[22] Filed Aug. 30, 1968
[45] Patented July 6, 1971
[73] Assignee Ford Motor Company, Dearborn, Mich.

[54] GLASS WINDOW STRUCTURE PROVIDING REDUCTION OF INTERFERENCE FRINGES
3 Claims, 5 Drawing Figs.

[52] U.S. Cl. ........................................... 350/319, 65/99, 350/163, 350/276
[51] Int. Cl. ........................................... G02b 27/00
[50] Field of Search ........................................... 350/319, 164, 163, 276; 117/33.3; 161/45, 2, 3.5

[56] References Cited
UNITED STATES PATENTS
| 2,827,739 | 3/1958 | Atkeson | 65/24 |
| 2,362,611 | 11/1944 | Brown | 350/319 UX |
| 2,750,637 | 6/1956 | Browne | 161/45 |

*Primary Examiner* — David Schonberg
*Assistant Examiner* — T. H. Kusmer
*Attorneys* — John R. Faulkner and William E. Johnson ABSTRACT: A glass window structure which eliminates Jamin interference fringes includes a frame for supporting a pair of glass brackets in spaced relationship. A first glass bracket is supported in the frame and this bracket is cut from a glass ribbon manufactured in a process wherein molten glass is flowed out upon a molten bath and processed thereon so that the glass ribbon is of substantially uniform thickness. A second glass bracket is also supported in the frame and this second bracket is cut from a glass ribbon manufactured in the same manner as the first bracket. The second bracket is of slightly different thickness than the first glass bracket, and the difference in thickness eliminates the Jamin fringes. Other window structures which eliminate the Jamin fringes are structures in which (1) at least one of the glass brackets has a tapering thickness from one side to the other side, (2) both brackets have similar tapering thicknesses with the thicker edges of the two brackets not being positioned on the same side of the frame, or (3) both brackets have different tapering thicknesses with the thicker edges being positioned in any manner.

JAMES E. HARVEY
MAX J. IRLAND
VICTOR L. LINDBERG
INVENTORS

BY John R. Faulkner
William E. Johnson
ATTORNEYS

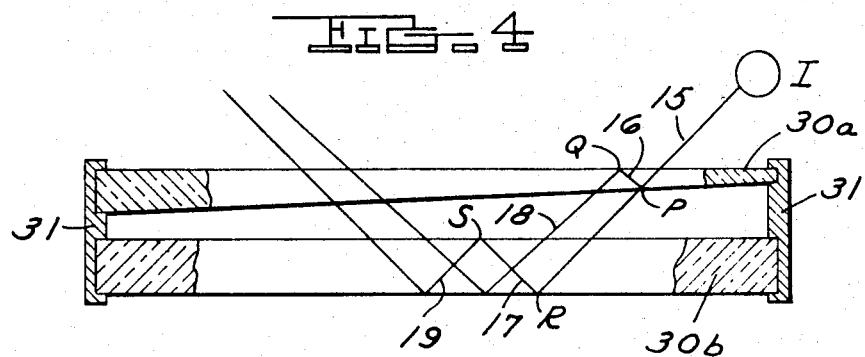
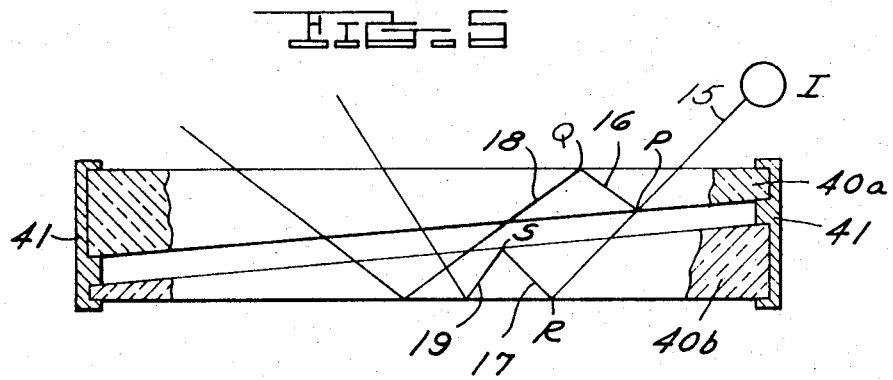

3,591,261

GLASS WINDOW STRUCTURE PROVIDING REDUCTION OF INTERFERENCE FRINGES

BACKGROUND OF THE INVENTION

In recent years the method of manufacturing flat glass has been improved by introduction of a glass manufacturing process in which molten glass is flowed out upon a molten bath of material and processed thereon so as to form a glass ribbon. This process is known as the float process of manufacturing glass. The glass ribbon produced by this process is particularly characterized in its uniform thickness across the width thereof and in the superior fire-polished surface on the two principal surfaces of the ribbon. Because of the superior surface finish on the glass so manufactured, the glazing industry now utilizes this type of glass most extensively in constructing window structures.

Included in the window structures formed by the superior quality glass manufactured by the float process are thermal window structures. In such a structure, a pair of glass brackets are mounted in a spaced, generally parallel relationship in a window frame. The thermal window structures may be utilized in any building wherein it is desired to have a window area serving as the closure element between the exterior and the interior of the building.

After some experience with the formation of thermal window structures utilizing the fire-polished, float glass of uniform thickness, persons in the glazing industry noted that fringes of color could be seen in the structures when the structures were viewed against a dull background under certain lighting conditions. The fringes of color gave a wood grain or oil stain appearance in the structure to the viewer's eye. Fringes of a generally similar appearance have in the past been familiar to fabricators of thermal windows. The previously known fringes could be made to disappear by inclining one glass bracket very slightly relative to the other. This remedy fails with some fringes especially those often associated with float glass, since the amount of inclination required to eliminate them is so great as to make the glass brackets conspicuously nonparallel, and moreover to exceed the space available in the frame of a thermal window structure.

Thus, although the thermal window structures constructed with float glass had many advantages, because of the superior surface characteristic of such glass, the structures were objectionable because under certain lighting conditions color fringes were visible. The purchaser of such a window structure generally felt that the structure was defective because of the appearance of the fringes. Thus, the purchaser of the structure was dissatisfied with the quality of the structure even though superior glass had been utilized in its fabrication.

SUMMARY OF THE INVENTION

This invention relates to a glass window structure and, more particularly, to a glass window structure such as a thermal window structure which utilizes float glass in its construction. In detail, the invention is directed to a window structure which eliminates the objectionable fringe pattern produced in such a structure when float glass of uniform thickness is utilized therein.

A glass window structure in accordance with an embodiment of this invention employs a window frame for supporting a pair of window glass brackets in spaced, generally parallel relationship. A first glass bracket supported in the frame is cut from a glass ribbon manufactured by the float process, that is, the process of manufacturing glass wherein molten glass is flowed out upon a molten bath and processed thereon so that the glass ribbon produced thereby is of a substantially uniform thickness, i.e. of a thickness substantially more uniform than either plate glass or sheet glass. A second glass bracket is supported in the window frame and the glass utilized for this bracket is also manufactured by the float process. However, the second glass bracket has a uniform thickness which is slightly different than the uniform thickness of the first glass bracket. The thickness difference between the two glass brackets is sufficient that when a beam of light is incident upon a surface of one of the brackets, the path length for two beams of light generated from the incident light by internal reflections in each of the brackets are sufficiently different in length that the generated beams do not eventually recombine to produce an interference fringe.

Thus, in one embodiment of the window structure of this invention, the objectionable fringe pattern obtained by using float glass of uniform thickness is eliminated by using varying thicknesses of float glass for the two window brackets, the thicknesses of the two brackets differing sufficiently that certain conditions are met whereby beams of light generated by an incident ray cannot come back together to produce fringes.

In alternate window structures, in accordance with additional teachings of this invention, at least one of the glass brackets of the window structure is formed of a glass ribbon manufactured in a float process which produces glass having a taper across the width thereof. When this tapered glass bracket is assembled with a glass bracket of uniform thickness, the objectionable fringes produced by two uniformly thick brackets of float glass are eliminated. Similarly, two brackets of tapered float glass may be utilized in the window construction to eliminate the fringe pattern. However, in this case, if the amount of taper is the same for both brackets, the thicker edges of each bracket must not be located on the same side of the window frame and, preferably, are on opposed sides of the window frame.

The window structure, in accordance with the teachings of this invention, is one which eliminates the interference fringes observed when two brackets of uniformly thick float glass are utilized in the construction of a two bracket window structure. The window structures, in accordance with this invention, do not have the particular interference fringe problem and they are, therefore, more popular with the glaziers and their customers because the customers do not complain about the fringe problem.

BRIEF DESCRIPTION OF THE DRAWINGS

FIG. 4 is an illustration of a second window structure formed in accordance with the teachings of this invention.

FIG. 5 is an illustration of still another window structure formed in accordance with the teachings of this invention.

DESCRIPTION OF THE PREFERRED EMBODIMENT

General

In the last few years the float process of manufacturing flat glass has become extremely popular. This process produces a glass ribbon of substantially uniform thickness which exhibits superior surface characteristics in that the surfaces of the ribbon are fire-polished to an extremely smooth finish. In the manufacture of flat glass by the float process, molten glass is flowed out upon a molten bath and while in contact with the bath, the glass is cooled to a temperature whereat the glass is self-supporting. During the cooling of the glass, the glass will assume a condition wherein the thickness of the glass across the width of the glass ribbon is substantially uniform and equal. The process of manufacturing float glass nearly always includes a stretching operation while the glass is plastic and in contact with the float bath. This stretching operation reduces glass thickness below that which occurs naturally as a result of equilibrium between buoyant forces and surface tension forces.

Float glass has become extremely popular in the glazing industry for the production of all shapes and sizes of window structures. This glass has found wide acceptance because the glass exhibits superior surface qualities which eliminate distortion when viewing an object therethrough. One particular type of window structure which is extremely popular is the thermal window wherein a pair of spaced and substantially parallel glass brackets are mounted in a window frame. Such a window structure may be utilized as a closure element for a building, and there is generally no need to place a storm window in front of the window structure during cold weather.

In past practice, when thermal window structures have been constructed by utilizing glass manufactured by the float process, a window structure having superior surface characteristics was achieved. However, certain unanticipated difficulties with the window structures constructed with float glass were sometimes encountered. More particularly, when light incident upon the window was viewed under particular conditions, the viewer's eye observed many iridescent marks in the window structure which could characteristically be described as a wood grain or oil stain appearance.

Figure 1:
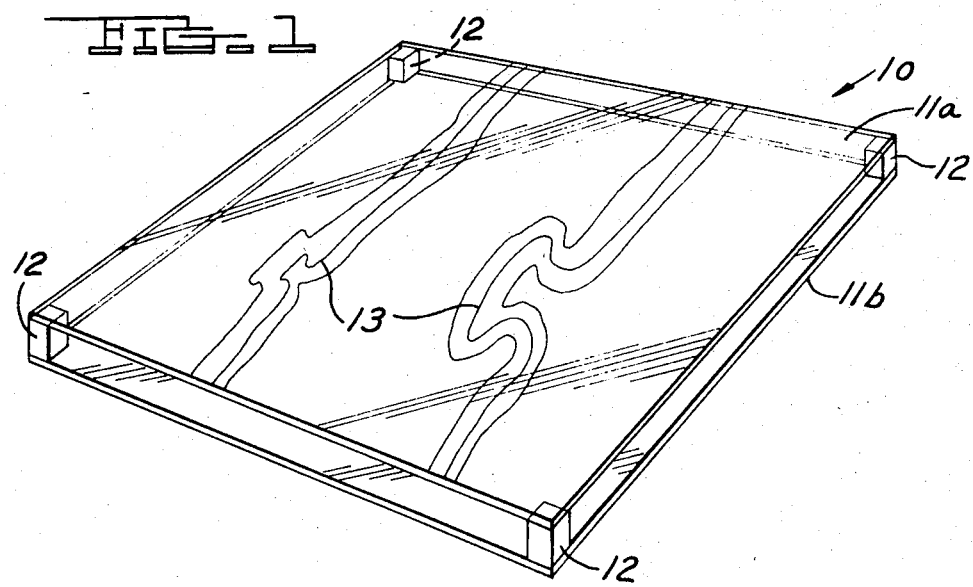
FIG. 1 is an isometric view showing an illustration of the occurrence of interference fringes hereinafter called Jamin fringes between a spaced pair of parallel glass brackets which have uniform and equal thicknesses.
Figure 2:
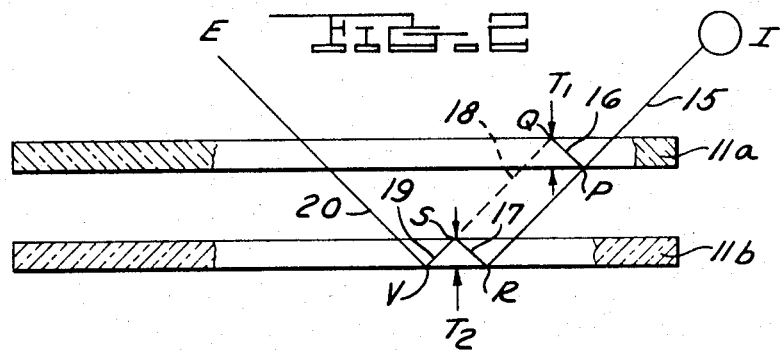
FIG. 2 is an illustration of the manner in which the Jamin fringes are developed, the illustration not taking into account the angles of incidence and refraction and secondary rays of light.

The iridescent marks in the thermal window structure formed by two pieces of uniformly thick float glass can best be understood by reference to FIGS. 1 and 2 of the associated drawings. In FIG. 1 a thermal window structure, generally designated by the numeral 10 is shown as being formed of two glass brackets 11a and 11b. Each bracket is of uniform thickness and is substantially identical in thickness to the other bracket. This uniformity in thickness would occur in the normal construction of such a window structure because adjacent, or almost adjacent, glass brackets cut from a continuous ribbon of glass would be utilized to construct the window structure. Adjacent brackets would be utilized because of the manner in which glass manufacturers package and ship the brackets to glass fabricators. The uniformity in thickness and the continued uniformity in thickness between the brackets of glass cut from a glass ribbon is a characteristic of the float process. In FIG. 1 a plurality of spacing blocks 12, representative of a window frame, are shown for holding the glass brackets 11a and 11b in spaced, substantially parallel relationship.

When white light is projected onto the upper surface of window structure 10 and the structure is mounted against a dull background, iridescent patterns of fringes 13 are visible in the structure 10. The fringes 13, as schematically represented in the drawing of FIG. 1, cover the full spectrum of light. While the fringes are not vivid, the colors are observable and are, therefore, irritating to a person who has paid for the structure. Three varieties of white light are defined in scientific work and are known as illuminants A, B and C. These were first defined in an article by D. B. Judd, "The I.Cl. Standard Observer and Coordinate System for Colorimetry" in the Journal of the Optical Society of America, volume 23, pp. 359—364.

The fringes observed in the window structure are of the type identified as Jamin fringes. The production of Jamin fringes occurs, as any other type of fringe, when a pair of optical path lengths through the glass window structure are substantially identical. The Jamin fringes are distinguished from the other fringes by the following: (1) all four surfaces of the two glass brackets are involved, and (2) the path lengths of the beams in each bracket are identical in length. The paths of the two beams are thus symmetrically disposed relative to one another within the two brackets. It is this symmetry which makes the Jamin fringes sensitive to the differences in thickness of the glass brackets. For example, with reference to FIG. 2 a ray of light is shown which produces the Jamin fringe in a construction such as the glazing unit of FIG. 1. In FIG. 2, the effects of refraction and secondary light rays have been omitted for the purpose of clarity although it is obvious to one skilled in the art that refraction and secondary rays would occur. The Jamin fringes are quite sensitive to the equality of the thicknesses, T1 and T2, of the two glass brackets 11a and 11b and are quite tolerant to the angle between the two glass brackets. Thus, if the two glass brackets are not exactly parallel to one another, the Jamin fringes can still occur as long as the two brackets are of equal and uniform thickness. The interference fringes are referred to as Jamin fringes because of the similarity of their origin to that of the fringes produced by a Jamin interferometer; see Jenkins and White, *Fundamentals of Optics*, 3rd. Ed., New York, McGraw Hill Inc., 1959, page 257.

With reference to FIG. 2, the Jamin fringes are produced when the beam of light 15 from the light source I passes into the first bracket 11a to the point P, at which point a portion of the light beam is reflected to generate a new beam of light 16 and a portion of the light passes on to the second bracket 11b. Another portion of the beam 15 is reflected at point R in the bracket 11b to generate a second new beam of light 17. The new beams of light 16 and 17 are again reflected at points Q and S, respectively, to generate new beams 18 and 19, respectively, the beam 18 being shown as a dotted line.

The thicknesses T1 and T2, respectively of the brackets 11a and 11b, are substantially equal within a few light wave lengths of one another and the angle between the two brackets is approximately 180°. Under these conditions, the beam 18 will fall upon the beam 19 and both will be reflected at point V to produce a new beam 20 which is observed by an observer from point E. Interference results from the wave properties of light. When light waves from a single source, or two mutually coherent sources, reach the eye (or other suitable detector) in the same phase, they reinforce; when their phases are opposite, they annul one another wholly or partially. Interference fringes are seen when the phase relationships of two coherent beams of light alternate in adjacent regions, producing alternately reinforcement and annulment. Each fringe is the geometrical locus of a constant phase relationship between the two beams. White light is coherent only for path differences of about 0.0001 inch. The Jamin fringe occurs, then when the optical path length from PRS is essentially equal to the optical path length PQS whereby the beams of light come together to form a new beam.

Thus, the highly desirable characteristic of the float glass, namely, its uniform thickness over extended lengths, results in the production of a thermal window structure which shows interference fringes against certain backgrounds and light conditions. While the interference fringes are not severe, they are annoying to one who has paid for the structure. The average customer considers that a window structure which produces such interference fringes has not been properly manufactured. Even though a customer does have a superior glass structure in many ways, he is generally dissatisfied with the structure because of the interference fringes which are visible.

Window Structure

The interference fringes of the Jamin type can be eliminated from the glass window structure by following the teachings of this invention. More particularly, the thicknesses of each of the two brackets of glass utilized to form the window structure should be different. The difference must be large enough that when a beam of light is incident upon the surface of one of the brackets, the path lengths for the beams of light generated therefrom by internal reflections in each of the brackets are sufficiently different that the generated beams do not eventually recombine to produce an interference fringe.

Figure 3:
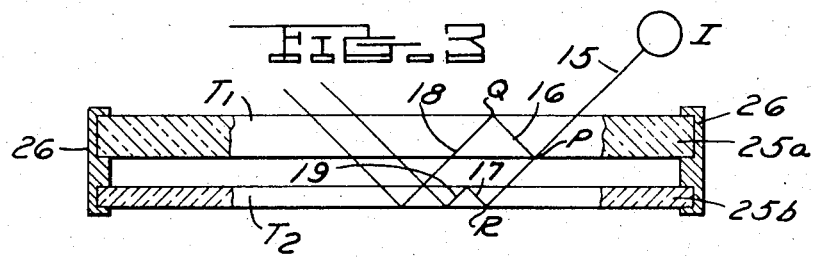
FIG. 3 is an illustration of a window structure formed in accordance with the teachings of this invention.

In the preferred construction, both of the window brackets are formed of float glass and each bracket is of uniform thickness throughout its entire extent. There is, however, a difference in thickness between the two brackets of at least 0.0001 inch and, preferably, a difference of at least 10 wave lengths of visible light. The construction shown in FIG. 3 is one wherein a pair of glass brackets 25a and 25b are mounted in a window frame 26 in spaced and substantially parallel relationship. The glass bracket 25a is slightly thicker than the glass brackets 25b. In this case, when a beam of light 15 from the source 1 strikes the first glass bracket 25a and divides at point P, the subsequently developed beams 18 and 19 do not recombine with one another to produce an interference fringe. The thickness between the two sheets must be at least 0.0001 inch and is, preferably, 10 wave lengths of visible light to change the path lengths of the beams sufficiently that no recombination of the beams takes place.

In accordance with a different embodiment of the window structure of this invention, as schematically presented in FIGS. 4 and 5, a float glass ribbon of nonuniform thickness is cut so as to produce glass brackets varying in thickness from one edge to the other edge. A method of manufacturing float glass having a tapering thickness from one edge thereof to the other edge thereof is described and claimed in copending U.S. Pat. application Ser. No. 756,439, filed Aug. 30, 1968 and assigned to the same assignee as this application. Briefly, in the method described in that application, molten glass is allowed to flow out upon a molten bath and is processed on the bath to obtain a taper across the width thereof by controlling the temperature in certain portions of the glass ribbon while lateral stretching forces are applied thereto. Molten glass is initially flowed out upon the bath and cooled to become a semirigid ribbon of glass. Thereafter, the glass ribbon is reheated but to varying degrees across the width thereof. When the lateral stretching forces are applied to the glass, the cooler portion of the glass is attenuated or stretched more than the hotter portions of the glass thereby forming a taper across the width of the glass ribbon. The taper formed in the glass ribbon has an angle of about 1 minute of arc. For further details of the process of making tapered float glass, reference is made to the mentioned application.

With reference to FIG. 4 an alternate embodiment of the window structure in accordance with this invention is shown. In this constructions a pair of glass brackets 30a and 30 b are mounted in frame members 31. As shown in FIG. 4, the taper of the glass bracket 30a is overemphasized. In normal construction this bracket would taper approximately 0.010 inch for every 100 inches of width. The glass bracket 30b is of uniform thickness across its entire width. In this structure, a beam of light 15 from light source 1 will produce two beams through the structure of unequal path length. The resulting rays of light emerging from the structure generally will not be incident upon one another and will, therefore, not recombine to cause the interference problem except for a very small central portion thereof where the fringes are inconspicuous to the unaided eye.

In FIG. 5 still another construction for the glass window structure is shown. In this case, both the glass brackets 40a and 40b, which are mounted in the frame members 41, are tapered. However, as is apparent from FIG. 5, the tapers in the brackets are opposed. In this case, light incident upon the bracket 40a will divide into two beams which will have unequal path lengths and, therefore, will not recombine whereby the Jamin fringe problem is again overcome except for a narrow band of the structure where the glass thicknesses are identical. As shown in FIG. 5, the two glass brackets 40a and 40b are positioned so that the thick edge of the glass bracket 40a is associated with the left frame member 41 while the thick edge of the bracket 40b is associated with the right frame member 41. In construction of the window structure, the only requirement is that the thick edges of the two brackets should not be on the same side of the window frame because in such a situation the overlying areas of glass wound have a substantially uniform thickness and a Jamin fringe pattern could be produced. If the taper in two glass brackets is substantially different then the thick edge of both of the brackets may be positioned on the same side of the window frame.

There has been disclosed in this application a new window structure. The window structure is one which eliminates objectionable fringe patterns in thermal window structures and still permits the utilization in such structures of glass manufactured by the float process. The glass manufactured by the float process has superior surface characteristics and, therefore, is most desirable in forming the thermal window structure.

The invention disclosed will have many modifications which will be apparent to those skilled in the art in view of the teachings of this specification. It is intended that all modifications which fall within the true spirit and scope of this invention be included within the scope of the appended claims.

What we claim is:

1. A glass window structure comprising:
   a frame for supporting a pair of glass brackets in spaced, generally parallel relationship;
   a first glass bracket supported in the frame, the glass bracket being cut from a glass ribbon manufactured in a process wherein molten glass if flowed out upon a molten bath and processed thereon so that the glass ribbon is of substantially uniform thickness; and
   a second glass bracket supported in the frame, the second glass bracket being cut from a ribbon of glass manufactured by the same process as the first glass bracket but the second glass bracket being of a uniform thickness slightly different than the first glass bracket, the thickness of the two glass brackets being sufficiently different that when a ray of light is incident upon the surface of one of the brackets the path lengths for two rays of light generated from the incident ray by internal reflections in each of the brackets are sufficiently different in length that the generated rays do not eventually reinforce on another to produce an interference fringe.

2. The glass window structure of claim 1 wherein the difference in thickness between said two glass brackets is at least 10 wave lengths of visible light.

3. The glass window structure of claim 1 wherein the difference in thickness between said two glass brackets exceeds 0.0001 inch.